United States Patent [19]

Panicali

[11] Patent Number: 5,228,941

[45] Date of Patent: Jul. 20, 1993

[54] DEVICE FOR SPLICING SELF-ADHESIVE CRUDE RUBBER SHEET MATERIAL

[75] Inventor: Marcello Panicali, Aprilia, Italy

[73] Assignee: Bridgestone Corporation, Tokyo, Japan

[21] Appl. No.: 708,547

[22] Filed: May 31, 1991

[30] Foreign Application Priority Data

Jun. 8, 1990 [IT] Italy .................. 67423 A/90

[51] Int. Cl.$^5$ ............................................. B29D 30/00
[52] U.S. Cl. ................... 156/421; 156/304.1; 156/544; 156/582
[58] Field of Search ............... 156/304.1, 304.5, 304.6, 156/304.7, 397, 421, 421.6, 502, 544, 582

[56] References Cited

U.S. PATENT DOCUMENTS

| | | | |
|---|---|---|---|
| 4,454,000 | 6/1984 | Schlemmer | 156/502 |
| 4,478,672 | 10/1984 | Precht | 156/421 |
| 4,793,890 | 12/1988 | Sato | 156/304.1 X |
| 4,867,823 | 9/1989 | Pizzorno | 156/502 X |
| 4,892,608 | 1/1990 | Lippa | 156/421 |
| 5,049,222 | 9/1991 | Irie | 156/304.1 X |

Primary Examiner—David A. Simmons
Assistant Examiner—Mark A. Osele
Attorney, Agent, or Firm—David A. Thomas

[57] ABSTRACT

A device (5) wherein, for splicing the facing edges (4a,4b) of a sheet (4) of unvulcanized rubber using a powered grip fixture (6) with a pressure member (11) and a counterpressure plate (36) for gripping the sheet (4) to a given pressure and imparting a given thrust on the edges (4a, 4b) of sheet (4) for bringing them together, the grip fixture (6) is moved back and forth along a route parallel to the edges (4a, 4b) of sheet (4) and defined by a guide (85) designed to move to and from an operating position wherein the counterpressure plate (36) and the edges (4a, 4b) of sheet (4) are substantially coplanar, and wherein lifting member (41, 64)(41, 65) cooperate with sheet (4) for lifting the respective edges (4a, 4b) onto the counterpressure plate (36) and into engagement with grip fixture (6).

11 Claims, 5 Drawing Sheets

DEVICE FOR SPLICING SELF-ADHESIVE CRUDE RUBBER SHEET MATERIAL

TECHNICAL FIELD

The present invention relates to a device for splicing self-adhesive crude or uncured rubber sheet material. The device according to the present invention may be employed to advantage, but not exclusively, for splicing the facing parallel end edges of a portion of a tire body ply reinforced internally with cords of synthetic material or wire, and which is fed and wound onto a tire building drum so that the opposite end edges are arranged facing and parallel.

BACKGROUND OF THE ART

In particular, the present invention relates to a splicing device of the aforementioned type comprising grip means designed to grip the sheet material to a given pressure and impart a given thrust on the edges for bringing them together, said grip means comprising pressure means and counterpressure plate means.

In connection with splicing devices of the aforementioned type, U.S. Pat. No. 4,454,000 relates to a manual splicing device wherein said pressure means, constituting one of the jaws of said grip means, comprise two disks (one of which is powered) inclined in relation to each other and contacting along the point of tangency facing said counterpressure plate means constituting the other jaw of said grip means. At said point of tangency, the two disks are connected so as to turn in the same direction about their respective axes, and are hinged to the counterpressure plate means so as to turn, in relation to and towards the same, by virtue of an adjustable thrust member. At said point of tangency, the outer edges of the two disks contact two externally threaded rollers inclined in relation to each other, mounted in idle manner on said counterpressure plate means, and connected so as to turn in the same direction.

In actual use, the operator inserts the front edge of the counterpressure plate means under the sheet material, so that the edges for splicing are located on opposite sides of a dividing rib on the plate means. The operator then moves the splicing device along the path defined by the two facing edges, which slide along the plate means and, at said point of tangency, between the inclined disks and inclined threaded rollers, which cooperate in such a manner as to bring together and pressure bond the edges.

The above noted splicing device has proven extremely effective in terms of performance, but definitely unsuitable for mass production use. In addition to requiring skilled labor, almost exclusively for operating the splicing device, it introduces into a substantially automatic production cycle an operation which cannot be predicted accurately in terms of performance time. This is mainly due to the critical nature of the first stage in the operation, wherein the counterpressure plate means are inserted under the sheet material which, being sticky and of relatively unstable shape, is easily crumpled.

SUMMARY OF THE INVENTION

The aim of the present invention is to provide a device of the aforementioned type designed to overcome the aforementioned drawbacks, and which is perfectly suitable for use in a substantially automatic production cycle.

With this aim in view, according to the present invention, there is provided a device for splicing self-adhesive crude or uncured rubber sheet material along facing edges of same, said device comprising grip means for gripping said sheet material to a given pressure and imparting a given thrust on said edges for bringing them together, said grip means comprising pressure means and counterpressure plate means; characterized by the fact that it comprises guide means connected to said grip means and defining, for same, a route parallel to and longer than said edges; activating means for moving said grip means back and forth along said route; control means for moving said guide means transversely to and from an operating position wherein said plate means and said edges are substantially coplanar; and lifting means designed, in said operating position, to cooperate with said sheet material for lifting said edges onto said plate means and into engagement with said grip means.

BRIEF, DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
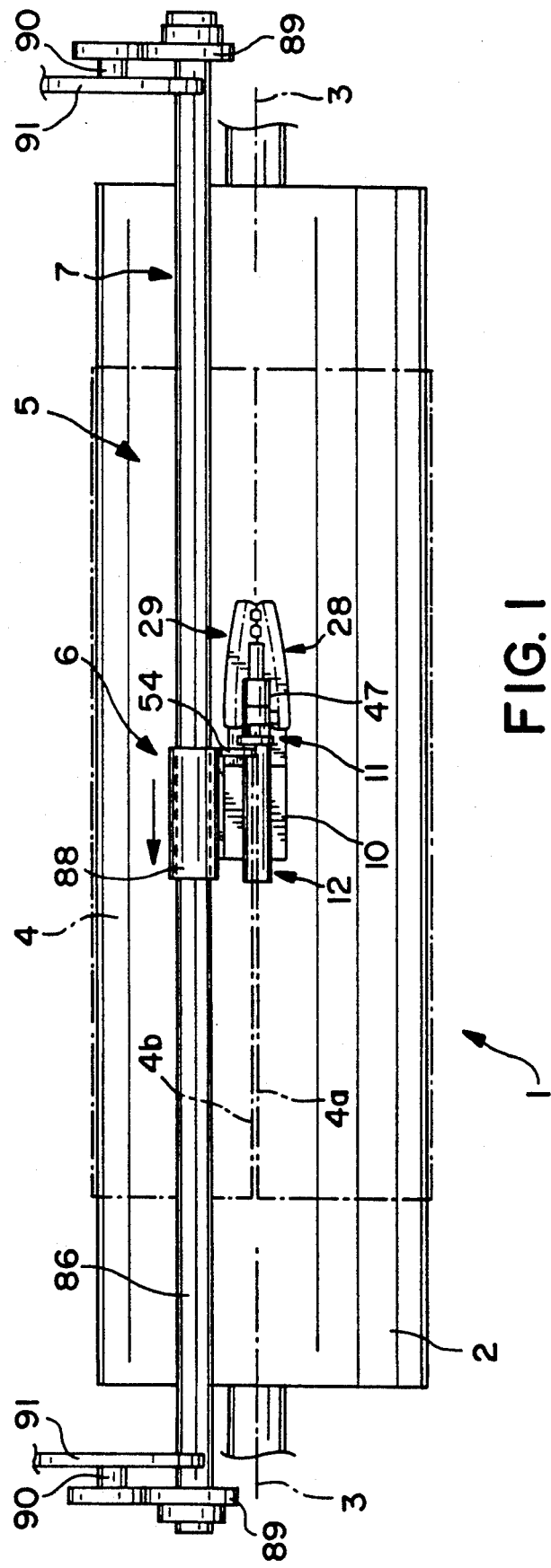
FIG. 1 shows a plan view, substantially in block form, of a preferred embodiment of the device according to the present invention.
Figure 2:
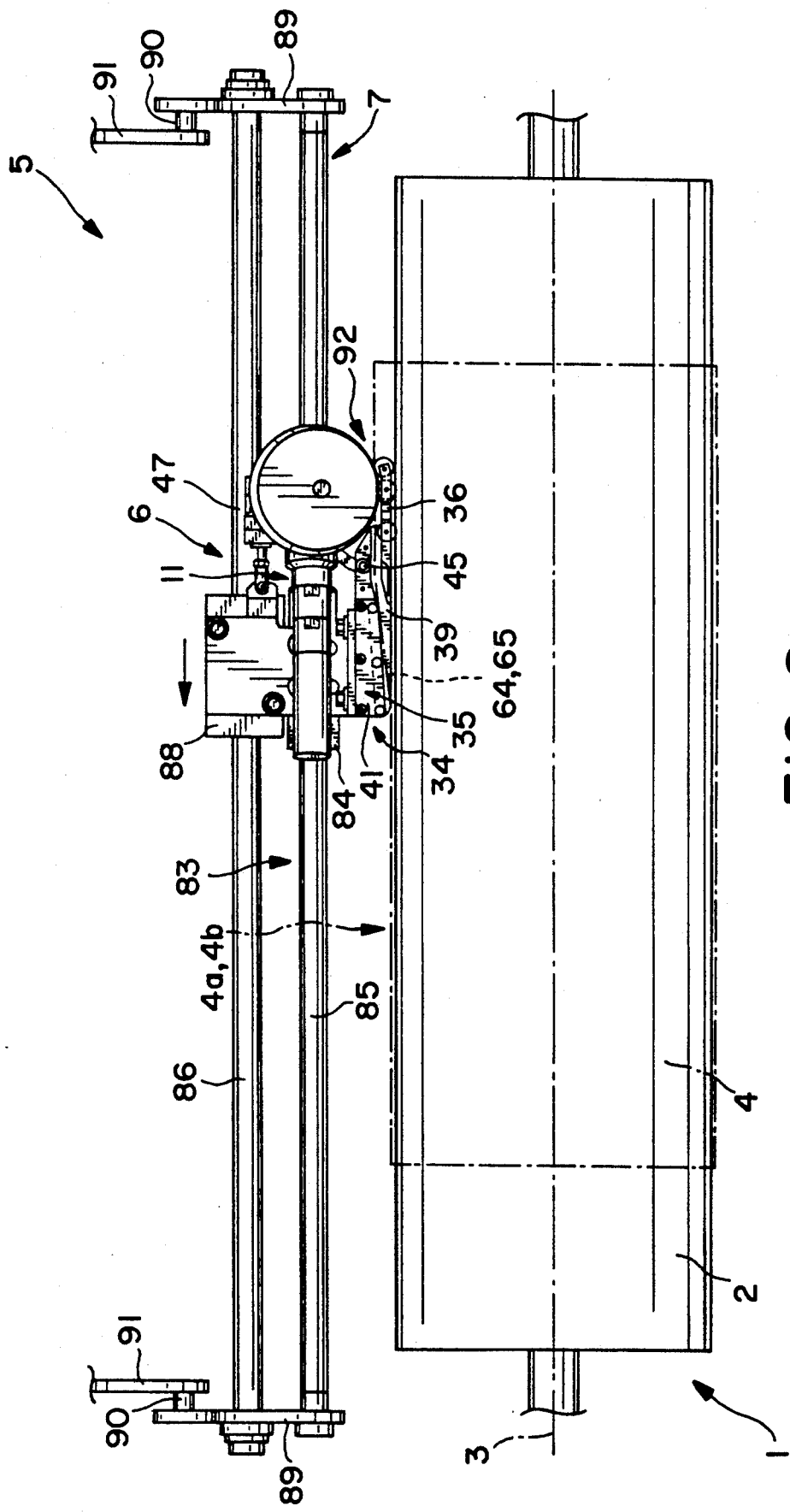
FIG. 2 shows a larger-scale side view of the FIG. 1 device.
Figure 3:
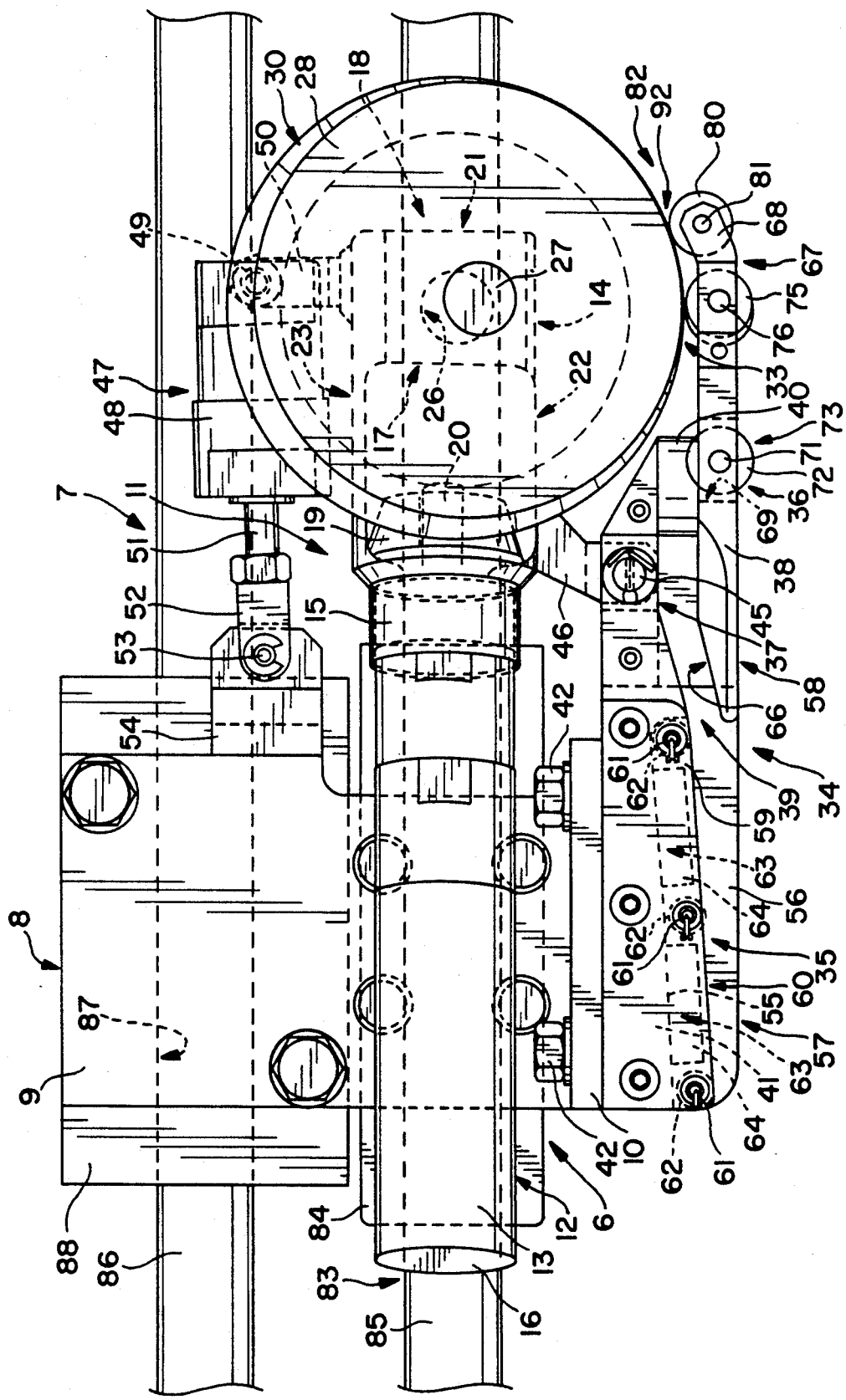
FIG. 3 shows a larger-scale view of a detail in FIG. 2.

Number 1 in FIGS. 1 to 3 indicates a tire building machine comprising a known tire building drum 2 with a substantially horizontal axis 3, and a known device (not shown) for successively feeding, onto the cylindrical outer surface of drum 2 and in a direction substantially perpendicular to axis 3, a number of self-adhesive crude or unvulcanized rubber or elastomeric body plies 4, each having a beveled front edge 4a and a beveled rear edge 4b (as referred to the traveling direction of body ply 4).

As shown in FIGS. 1 and 2, each body ply 4 is wound onto drum 2 so that edges 4a and 4b are arranged facing and in such a position as to enable them to be spliced by a splicing device 5 supported on said feed device (not shown).

Device 5 comprises a powered fixture 6 and a guide device 7 for guiding fixture 6 as it travels along a loop extending over a substantially radial plane of drum 2 and comprising two branches substantially parallel to the generating line of the outer surface of drum 2 and of a length greater than the width of body ply 4.

Figure 4:
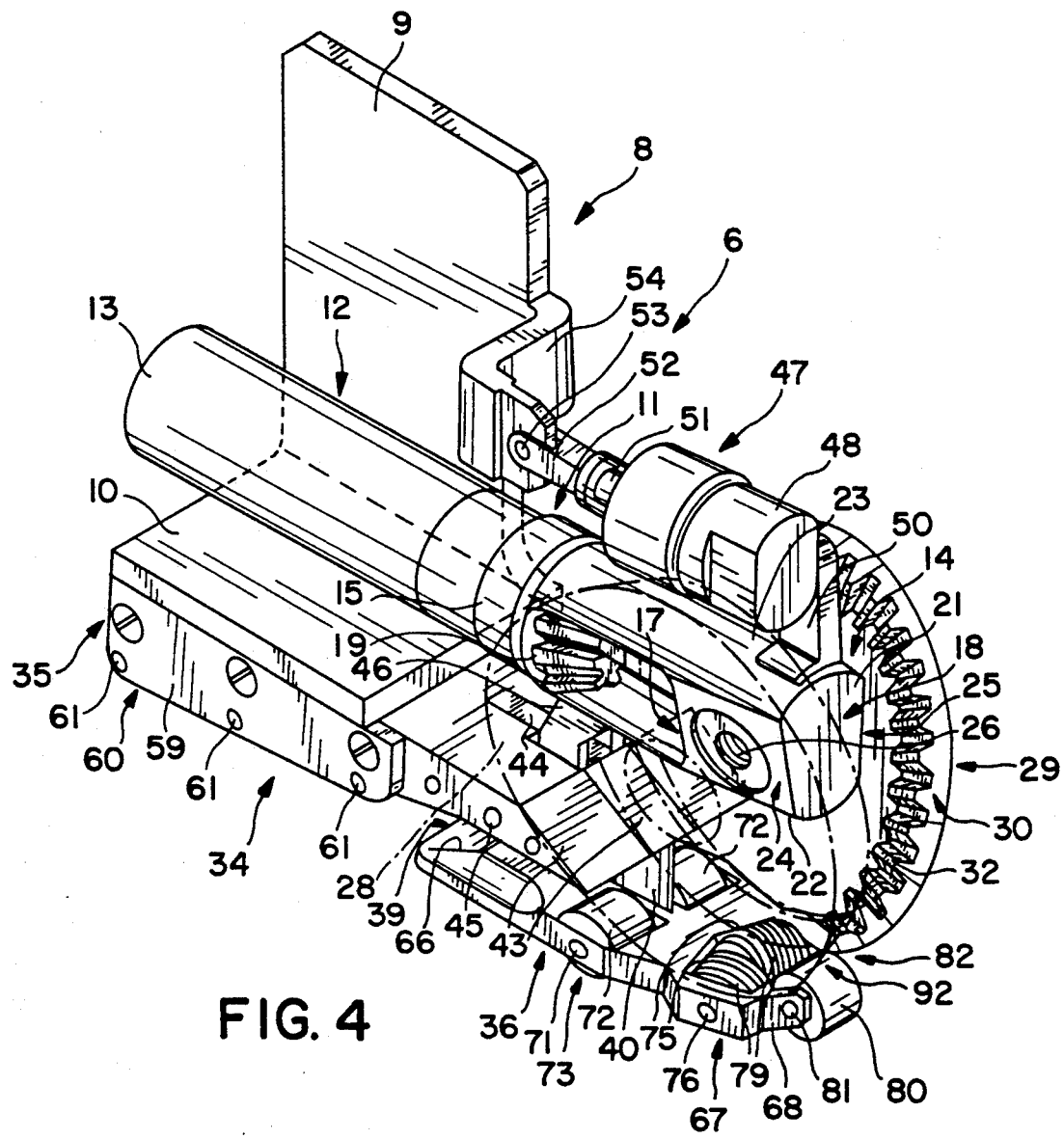
FIG. 4 shows a view in perspective of the FIG. 3 detail with parts removed for simplicity.
Figure 5:
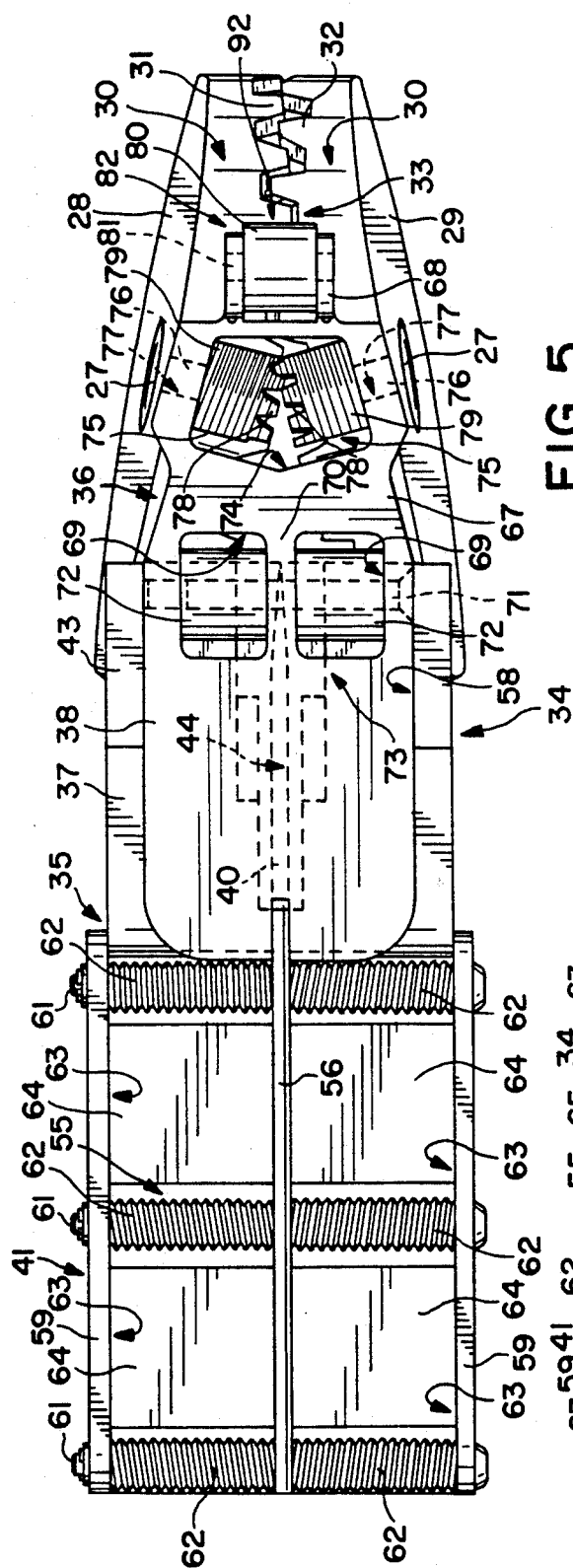
FIG. 5 shows a larger-scale bottom plan view of the FIG. 3 detail.

With reference to FIG. 4 and, particularly, FIG. 5, fixture 6 comprises a substantially L-shaped plate or frame 8 in turn comprising a substantially vertical arm 9 parallel to the FIG. 3 plane, and a substantially horizontal arm 10 extending from the bottom edge of arm 9 in a direction substantially perpendicular to the FIG. 3 plane.

Fixture 6 also comprises a powered splicing unit 11 in turn comprising a tubular body 12 having its axis substantially parallel to axis 3, and located over arm 10 in a plane parallel to arm 9 and substantially central in relation to arm 10. Tubular body 12 comprises a front portion 13 and a rear portion 14 substantially coaxial with each other and located on opposite sides of a splicing collar 15. Portion 13 is substantially cylindrical, and constitutes the outer casing of a pneumatic motor 16 connectable to an external supply means (not shown).

As shown, particularly in FIG. 4, portion 14 presents a transverse through channel 17 substantially parallel to arm 10, perpendicular to axis 3 and formed between collar 15 and the rear end portion 18 of portion 14. Channel 17 houses a conical pinion 19 fitted onto the output shaft 20 of motor 16 (FIG. 3) and projecting laterally from one end of channel 17. End portion 18 tapers towards a rear end surface 21, and presents a substantially trapezoidal cross section, the shorter side of which consists of a curved bottom surface 22 with its concave side facing upwards, the longer side of which consists of a curved top surface 23 with its concave side facing downwards, and the lateral surfaces of which are two flat surfaces 24, 25 inclined at the same angle in relation to a vertical plane through the axis of portion 14 and converging towards surface 22.

A threaded hole 26 is formed through each of surfaces 24 and 25 for connecting to portion 14 two pins 27 perpendicular to respective surfaces 24 and 25 and supporting in idle manner respective disks 28 and 29. Each disk 28, 29 is defined externally by a truncated-cone surface 30 tapering outwards by substantially the same angle as that at which respective surfaces 24, 25 are inclined in relation to said vertical plane through the axis of portion 14. On the side facing respective surfaces 24, 25, disks 28 and 29 present respective identical teeth 31 and 32 which, due to the inclination of respective pins 27, mesh over a bottom point of tangency 33 between disks 28 and 29. In addition to teeth 32, teeth 31 also mesh with conical pinion 19.

In addition to unit 11, fixture 6 also comprises a base 34 supporting unit 11, connected to frame 8 and cooperating with unit 11 for splicing facing edges 4a and 4b of body ply 4 wrapped around drum 2.

With reference to FIG. 3 and, particularly, FIG. 4, base 34 provides an alignment mechanism which includes a front plate 35 and a rear plate 36 substantially aligned in the direction of axis 3 and partially overlapping, so as to define, between the top rear portion 37 of plate 35 and the bottom front portion 38 of plate 36, an upward channel 39 divided longitudinally into two equal parts by a central blade 40 perpendicular to plates 35 and 36 and connecting the same integral with each other.

Plate 35 comprises a substantially rectangular front portion 41 connected to the bottom surface of arm 10 of frame 8 by means of a number of screws 42. Rear portion 37 of plate 35 comprises two side by side plates 43 projecting from the rear edge of front portion 41 and defining an opening 44 engaged by top appendixes on blade 40. Said plates 43 define a fork to which is hinged, by means of a transverse pin 45, the bottom end of an arm 46 extending upwards from plate 35 and the top end of which is connected integral with a point on surface 22 of rear portion 14 of unit 11, so as to support and enable unit 11 to swing in relation to frame 8 about a substantially horizontal axis perpendicular to axis 3.

The angular position of unit 11 about the axis of pin 45 is controlled by a pressure member 47 comprising an adjustable thrust cylinder 48 hinged at 49 to a fork 50 extending upwards from the rear end of rear portion 14. On the opposite side to that connected to fork 50, cylinder 48 presents an output rod 51 of adjustable length and comprising, on its free end, a fork 52 hinged at 53 to the end of a bracket 54 integral with arm 9 of frame 8.

Front portion 41 of plate 35 is defined at the bottom by a surface 55 sloping upwards towards plate 36. Surface 55 is divided longitudinally into two equal parts by a central rib 56 constituting a forward extension of blade 40 and having a bottom surface 57 lying in the same plane as bottom surface 58 of front portion 38 of plate 36, and parallel to the bottom surface of arm 10 of frame 8. Surface 55 is defined laterally by two longitudinal ribs 59 parallel to each other and to rib 56, and located on opposite sides of rib 56. Each of ribs 59 is defined at the bottom by a flat surface 60 parallel to surface 55 and raised in relation to surface 57.

As shown more clearly in FIG. 5, between ribs 59 and through rib 56, there are mounted three transverse pins 61 parallel to one another and to surface 55. Pins 61 each support, in rotary manner, two hollow, externally threaded sleeves or rollers 62 located on opposite sides of rib 56, and cooperate with rib 56 for dividing the space between the two ribs 59 into four cavities or cells 63. According to the FIG. 5 embodiment, inside each cell 63, plate 35 is fitted with a plate 64 of magnetic material, the thickness of which is less than the depth of cells 63.

Figure 6:
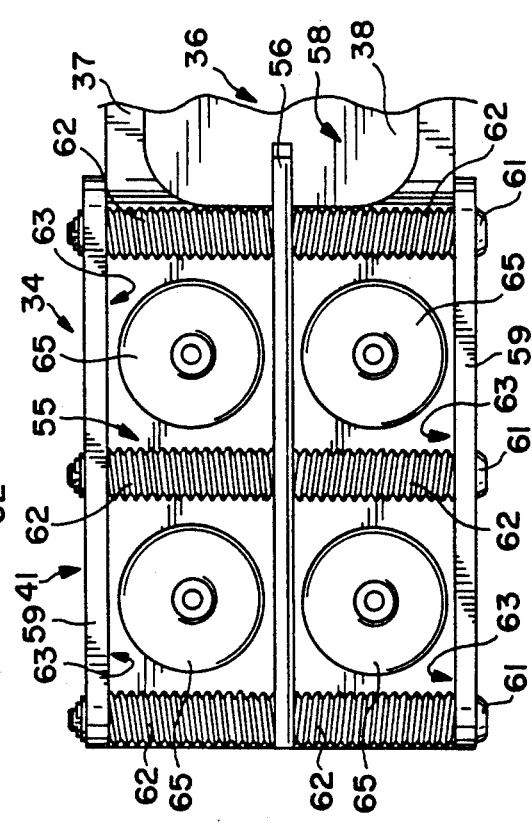
FIG. 6 shows a variation of a detail in FIG. 5.

According to the variation shown in FIG. 6, inside each cell 63, plate 35 presents a suction device 65 connected to a suction source or source of subatmospheric pressure (not shown) and the thickness of which is also less than the depth of cells 63.

As shown in FIGS. 3, 4 and 5, front portion 38 of rear plate 36 is substantially rectangular and presents, along the top front edge and part of its side edges, a lead-in bevel 66 for insertion of edges 4a and 4b of body ply 4 inside channel 39. Plate 36 also comprises a rear portion 67 extending from the rear edge of portion 38 and tapering towards its rear end from which a fork 68 extends rearwards. Astride the splice, between front portion 38 and rear portion 67, plate 36 presents two through openings 69 separated by a central partition 70 beneath the rear end of blade 40, and fitted through with a transverse pin 71 substantially perpendicular to axis 3 and supporting in rotary manner a roller 72 inside each opening 69. Said two rollers 72 project from the bottom of respective openings 69, and constitute a rolling assembly 73 for moving unit 11 along the generating line of drum 2. Close to its rear end, rear portion 67 of plate 36 presents a further opening 74 housing two cylindrical, substantially transverse rollers 75 supported in projecting manner on respective pins 76 mounted for rotation inside respective holes 77 formed in rear portion 67. The respective axes of holes 77 and, consequently, rollers 75 slope towards each other and towards front portion 38 of plate 36, and lie in a plane substantially parallel to surface 57.

Rollers 75 are arranged substantially tangent to each other at their free ends, each of which presents front teeth 78 meshing with those of the other roller 75, so as to link rollers 75 together. Rollers 75 project from the top of plate 36, and present respective outer threads 79 which, when rollers 75 are inclined in relation to each other, cooperate with the bottom surface of body ply 4 along respective edges 4a and 4b, for pushing said edges 4a and 4b together. Behind rollers 75, fork 68 supports a further cylindrical roller 80 supported for rotation on a transverse pin 81 lying in a higher plane than pins 76 and parallel to pin 45.

As shown particularly in FIG. 3, unit 11 and pressure member 47, on the one hand, and rear plate 36, on the other, constitute the opposite arms of a grip 82 wherein the moment applied by pressure member 47 on unit 11 turns unit 11 about the axis of pin 45 (clockwise in FIG. 3) so that, at rest, the bottom point of tangency 33 between disks 28 and 29 is brought into contact with the outer edge of rollers 75 and roller 80, with a given contact pressure corresponding in use to the pressure with which body ply 4 is gripped between top disks 28, 29 and bottom rollers 75, 80.

As shown in FIG. 3, guide device 7 comprises a known pneumatic actuator 83 in turn comprising a block 84, connected integral with arm 9 of frame 8, and a known linear cylinder 85 extending through block 84 parallel to axis 3. Guide device 7 also comprises a rod 86 over and parallel to cylinder 85, and which engages a through hole 87 formed in a block 88 connected integral with arm 9 over block 84.

As shown in FIGS. 1 and 2, cylinder 85 and rod 86 are longer than drum 2, and are connected together, at each end, by a plate 89 projecting beyond rod 86 and fitted with a top pin 90 parallel to rod 86 and connected in rotary manner to one end of a lever 91. The other end of lever 91 (not shown) is connected in rotary manner to said body ply feed device (not shown) so as to turn, in relation to the same, about an axis (not shown) parallel to rod 86 and by virtue of known actuating means (not shown).

In actual use, device 5 is maintained by lever 91 in a raised position in relation to drum 2 while body ply 4 is being wrapped about the same. Once this has been completed, drum 2 is turned so as to position facing edges 4a and 4b of body ply 4 underneath device 5 which, from said initial raised idle position, is lowered automatically by levers 91 into an initial operating position, wherein surface 57 of rib 56 contacts the outer surface of drum 2 (or the outer surface of a layer of material (not shown) previously fed onto drum 2) outwards of a respective end of body ply 4. In this position, rib 56 is aligned with edges 4a and 4b, and rear plate 36 lies substantially in the same plane as body ply 4.

At this point, according to a fully automatic cycle preferably controlled by a processor (not shown), fixture 6 is moved by actuator 83 of guide device 7 along guide rod 86 and in a straight line parallel to edges 4a and 4b. As, during said displacement, front plate 35 of base 34 moves over the initial lateral portion of body ply 4, with central rib 56 separating edges 4a and 4b, the portions of body ply 4 adjacent to edges 4a and 4b are raised into contact with surfaces 60 of ribs 59.

If body ply 4 is reinforced internally with metal wires (not shown), edges 4a and 4b are raised by means of magnetic plates 64. If, on the other hand, body ply 4 is reinforced internally With synthetic or non-metallic cords (not shown) or consists of sheet material with no reinforcement, edges 4a and 4b are raised by means of suction devices 65.

As fixture 6 is moved forward by actuator 83, the portions of body ply 4 adjacent to edges 4a and 4b slide, in the raised position contacting respective surfaces 60, safely over the front bevel 66 of plate 36 into channel 39, and past the rear end of blade 40 to a splicing zone 92 located between the point of tangency 33 of disks 28, 29 and rollers 75.

Edges 4a and 4b are then spliced fully automatically as described in U.S. Pat. No. 4,454,000, the content of which is fully incorporated herein in the interest of full disclosure. Once edges 4a and 4b are spliced, device 5 is raised by levers 91 and returned to the raised starting position by actuator 83.

The device according to the present invention therefore provides for splicing edges 4a and 4b of body ply 4 fully automatically, with no need for skilled labor and to a high degree of timing precision, mainly due to the portions of body ply 4 adjacent to edges 4a and 4b being raised automatically prior to and throughout the splicing operation.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A device for splicing self-adhesive unvulcanized rubber sheet material on a forming member along facing edges of said sheet material, said device comprising grip means for gripping said sheet material to a given pressure and imparting a given thrust on said edges for bringing them together, said grip means including pressure means and counterpressure plate means; guide means connected to said grip means and defining, for same, a route parallel to and longer than said edges; activating means for moving said grip means back and forth along said route; control means for moving said guide means transversely to and from an operating position wherein said plate means and said edges are substantially coplanar; alignment means for aligning the edges with each other, with the guide means, and into substantial alignment with a splicing zone, positioned such that said edges pass through said alignment means before said splicing zone; and lifting means positioned apart from said grip means, in said operating position, to cooperate with said sheet material for lifting said edges onto said plate means, into said alignment means, into substantial alignment with the splicing zone, and into engagement with said grip means, with said plate means traveling under said self-adhesive unvulcanized sheet.

2. A device as claimed in claim 1 wherein said alignment means includes a base formed by said counterpressure plate means and a second plate facing each other along respective first portions; a channel extending through said base between said first portions for feeding said sheet material to said splicing zone; and separating means extending along said channel for separating said edges upstream from said splicing zone and integrally connecting said plates; said first plate facing said pressure means and constituting said couterpressure plate means.

3. A device as claimed in claim 2, wherein part of said separating means extend along said second plate.

4. A device as claimed in claim 3, wherein said pressure means are supported on and connected to said base so as to turn, in relation to said base, about an axis substantially perpendicular to said route.

5. A device as claimed in claim 4, wherein said lifting means are located on said second plate; said second plate presenting an inclined surface facing, in use, said sheet material; and said lifting means cooperating, in use, with said sheet material for lifting the same towards said inclined surface.

6. A device for splicing self-adhesive unvulcanized rubber sheet material along facing edges of said sheet material, said device comprising grip means for gripping said sheet material to a given pressure and imparting a given thrust on said edges for bringing them together, said grip means including pressure means and counterpressure plate means; a base formed by the counterpressure plate means and a second plate facing each other along respective first portions, said counterpressure plate means facing said pressure means; lifting means located on said second plate for cooperating with said sheet material when in the operating position for lifting said edges onto said counterpressure plate means and into substantial alignment with a splicing zone and into engagement with said grip means; a plurality of cavities presented by said second plate, on a side facing the sheet material when in use, for housing said lifting means; guide means connecting to said grip means and defining, for the guide means, a route parallel to and longer than said edges; activating means for moving said grip means back and forth along said route; control means for moving said guide means transversely to and rom an operating position wherein the plate means and the edges are substantially coplanar; a channel extending through said base between said first portions for feeding said sheet material to said splicing zone; separating means extending along said channel and said second plate for separating said edges upstream from said splicing zone and integrally connecting said plates; said pressure means being supported on and connected to said base so as to turn, in relation to said base, on an axis substantially perpendicular to said route; said second plate presenting an inclined surface facing, in use, said sheet material; and said lifting means cooperating, in use, with said sheet material for lifting said sheet material towards said inclined surface.

7. A device as claimed in claim 6 wherein said base supports rotary, externally threaded rollers arranged crosswise in relation to said route; said rollers partly defining said cavities.

8. A device as claimed in claim 7, wherein said lifting means comprise a number of magnetic plates.

9. A device as claimed in claim 7, wherein said lifting means comprise a number of suction means.

10. A device as claimed in claim 9, further comprising a supporting frame integral with said second plate and connected to said guide means and said activating means.

11. A device as claimed in claim 9, wherein connecting means are provided for integrally connecting said guide means and said activating means; said control means being connected to said connecting means.

* * * * *